United States Patent [19]
Miller

[11] Patent Number: 5,570,322
[45] Date of Patent: Oct. 29, 1996

[54] BARRACUDA-REPELLING SOUND GENERATION DEVICE

[76] Inventor: Michael T. Miller, 1010 Dove Rd., Key Largo, Fla. 33037

[21] Appl. No.: 393,195

[22] Filed: Feb. 23, 1995

[51] Int. Cl.⁶ .................................................. G10K 1/00
[52] U.S. Cl. ......................... 367/107; 367/173; 367/910; 367/139
[58] Field of Search ................................. 367/107, 173, 367/910, 139

[56] References Cited

U.S. PATENT DOCUMENTS

| | | | |
|---|---|---|---|
| 3,802,109 | 4/1974 | Stein | 367/107 |
| 3,885,338 | 5/1975 | York | 367/107 |
| 4,212,258 | 7/1980 | Collins | 114/312 |
| 4,281,404 | 7/1981 | Morrow, Jr. et al. | 367/108 |
| 4,571,579 | 2/1986 | Woolley | 367/136 |
| 4,646,276 | 2/1987 | Kowalewski et al. | 367/139 |

*Primary Examiner*—J. Woodrow Eldred

[57] ABSTRACT

A barracuda-repelling sound generation device including a sound generator mechanism for generating a speaker activation signal when electrically energized; a remote speaker mechanism positionable beneath the surface of a body of water for generating a noise irritating to barracudas upon receipt of the speaker activation signal; a speaker cable mechanism for transferring speaker activation signals from the sound generator mechanism to the speaker mechanism; a power supply mechanism for supplying electrical energy for operation; and a power switch mechanism for selectively supplying electrical energy to the sound generator mechanism.

12 Claims, 6 Drawing Sheets

FIG. 6

BARRACUDA-REPELLING SOUND GENERATION DEVICE

BACKGROUND OF THE INVENTION

1. Field of the Invention

The present invention relates to a barracuda-repelling sound generation device and more particularly pertains to driving away barracudas in an area with a barracuda-repelling sound generation device.

2. Description of the Prior Art

The use of acoustic devices is known in the prior art. More specifically, acoustic devices heretofore devised and utilized for the purpose of repelling predatory fish are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,211,980 to Stowell discloses a method of creating an electric field for shark repellant. U.S. Pat. No. 4,566,085 to Weinberg discloses a high intensity ultrasonic generator. U.S. Pat. No. 4,580,525 to Marzluf discloses an electrical fish chasing device. U.S. Pat. No. 4,593,648 to Marzluf discloses an electric fish-repelling device. U.S. Pat. No. 4,955,005 to Loeffelman discloses an underwater acoustic animal guidance system.

While these devices fulfill their respective, particular objective and requirements, the aforementioned patents do not describe a barracuda-repelling sound generation device that repels barracudas and thus prevents them from preying on fish that are hooked by fishermen. Furthermore, the aforementioned patents do not describe a barracuda-repelling sound generation device that repels barracudas and thus prevents them from attacking swimmers or divers.

In this respect, the barracuda-repelling sound generation device according to the present invention substantially departs from the conventional concepts and designs of the prior art, and in doing so provides an apparatus primarily developed for the purpose of driving away barracudas in an area.

Therefore, it can be appreciated that there exists a continuing need for new and improved barracuda-repelling sound generation device which can be used for driving away barracudas in an area. In this regard, the present invention substantially fulfills this need.

SUMMARY OF THE INVENTION

In the view of the foregoing disadvantages inherent in the known types of acoustic devices now present in the prior art, the present invention provides an improved barracuda-repelling sound generation device. As such, the general purpose of the present invention, which will be described subsequently in greater detail, is to provide a new and improved barracuda-repelling sound generation device and method which has all the advantages of the prior art and none of the disadvantages.

To attain this, the present invention essentially comprises, in combination, a hollow rectangular box-shaped container formed of a rigid waterproof plastic having a top wall, a bottom wall, and a periphery interconnected therebetween. The periphery is formed of a pair of long side walls and a pair of short side walls. The container further includes a hole disposed through one short side wall with a grommet snugly fit therein. A sound generator is included and disposed within the container for generating a speaker activation signal when electrically energized. An amplifier is also included. The amplifier is disposed within the container and coupled to the sound generator for receiving the speaker activation signal and transmitting an amplified speaker activation signal. A speaker is included for generating a noise irritating to barracudas when the speaker receives of the amplified speaker activation signal. An elongated electrically-conductive sheathed waterproof speaker cable is included for transferring amplified speaker activation signals from the amplifier to the speaker. The speaker cable has a length at least 15 times greater than the length of the container. The speaker cable further includes a base end snugly extended through the grommet of the container and coupled to the amplifier and a tip end coupled to the speaker. A rigid waterproof plastic first hemispheric shell is included and secured about the tip end of the cable and peripherally extended about and secured to the speaker. A perforated rigid waterproof plastic second hemispheric shell is also included and coupled to the first hemispheric shell to define a sphere that generally encases the speaker. A battery is included and disposed within the container for supplying electrical energy for operation. A power switch is included and coupled between the battery and sound generator and extended upwards through the top wall of the container. The power switch has an enabled orientation for allowing the sound generator to be electrically energized and a disabled orientation for preventing the sound generator from being electrically energized. Lastly, a lamp is included coupled between the power switch and sound generator and extended upwards through the top wall of the container at a location proximal with the power switch. The lamp is illuminated when the power switch is placed in the enabled orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

3

It is therefore an object of the present invention to provide a new and improved barracuda-repelling sound generation device which has all the advantages of the prior art acoustic devices and none of the disadvantages.

It is another object of the present invention to provide a new and improved barracuda-repelling sound generation device which may be easily and efficiently manufactured and marketed.

It is a further object of the present invention to provide a new and improved barracuda-repelling sound generation device which is of durable and reliable construction.

An even further object of the present invention is to provide a new and improved barracuda-repelling sound generation device which is susceptible of a low cost of manufacture with regard to both materials and labor, and which accordingly is then susceptible of low prices of sale to the consuming public, thereby making such a barracuda-repelling sound generation device economically available to the buying public.

Still yet another object of the present invention is to provide a new and improved barracuda-repelling sound generation device which provides in the apparatuses and methods of the prior art some of the advantages thereof, while simultaneously overcoming some of the disadvantages normally associated therewith.

Even still another object of the present invention is to provide a new and improved barracuda-repelling sound generation device for driving away barracudas in an area.

Lastly, it is an object of the present invention to provide a new and improved barracuda-repelling sound generation device comprising sound generator means for generating a speaker activation signal when electrically energized; remote speaker means for generating a noise irritating to barracudas upon receipt of the speaker activation signal; speaker cable means for transferring speaker activation signals from the sound generator means to the speaker means; power supply means for supplying electrical energy for operation; and power switch means for selectively supplying electrical energy to the sound generator means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

4

The same reference numerals refer to the same parts through the various Figures.

DESCRIPTION OF THE PREFERRED EMBODIMENT

Figure 1:
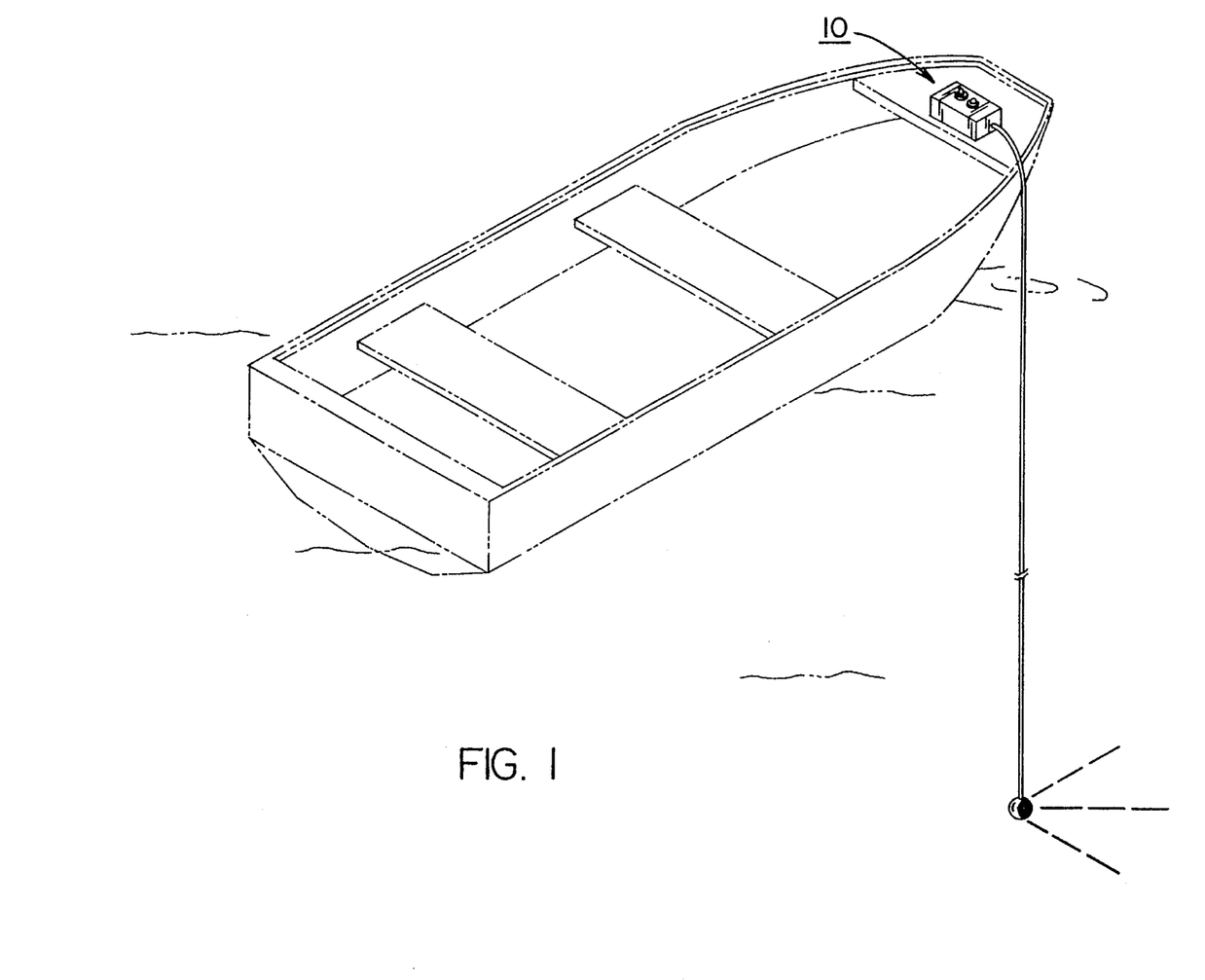
FIG. 1 is a perspective view of the preferred embodiment constructed in accordance with the principles of the present invention secured in an operable mode for repelling barracudas.
Figure 2:
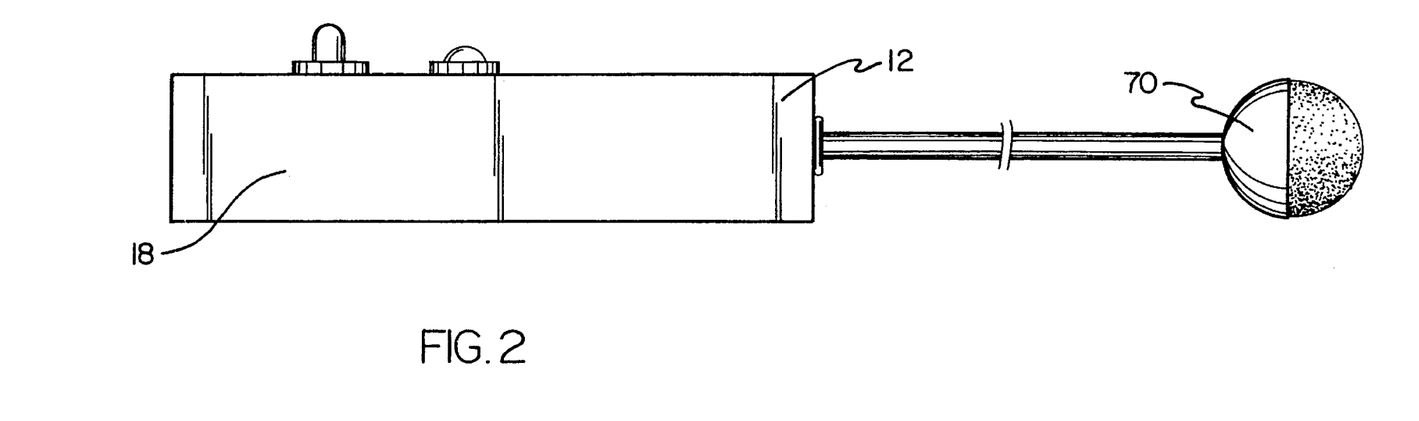
FIG. 2 is a side-elevational view of the present invention.

With reference now to the drawings, and in particular, to FIG. 1 thereof, the preferred embodiment of the new and improved barracuda-repelling sound generation device embodying the principles and concepts of the present invention and generally designated by the reference number 10 will be described.

The present invention is comprised of a plurality of components. In their broadest context, such components include a container, a sound generator, an amplifier, and a speaker. Such components are individually configured and correlated with respect to each other to provide the function of generating an irritating noise for driving away or repelling barracudas in a particular area.

Specifically, the present invention includes a container 12. The container is hollow and has a rectangular box-shape. The container is formed of a rigid waterproof plastic. The container has a top wall 14, a bottom wall 16, and a periphery interconnected therebetween. The periphery is formed of a pair of long rectangular side walls 18 and a pair of short rectangular side walls 20. The container also has a hole 22 disposed through one short side wall and a rubber grommet 24 snugly fit therein.

Figure 4:
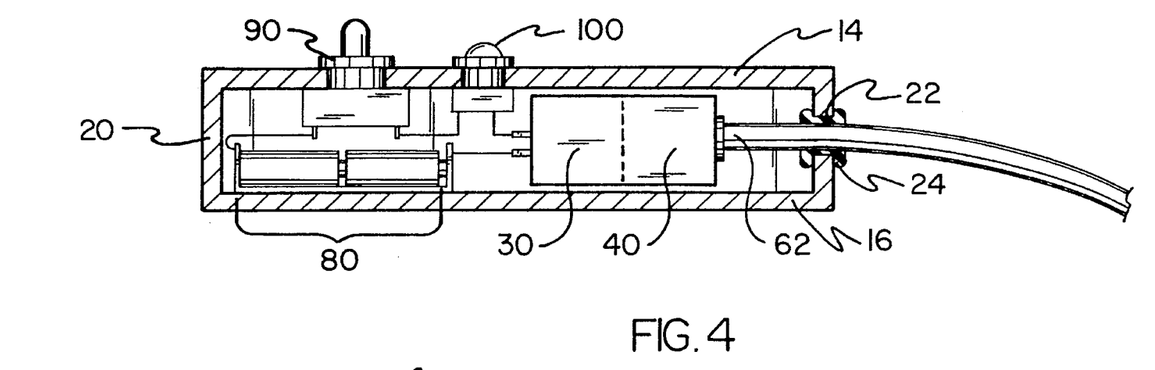
FIG. 4 is a cross-sectional view of the present invention taken along the line 4—4 of FIG. 3.
Figure 6:
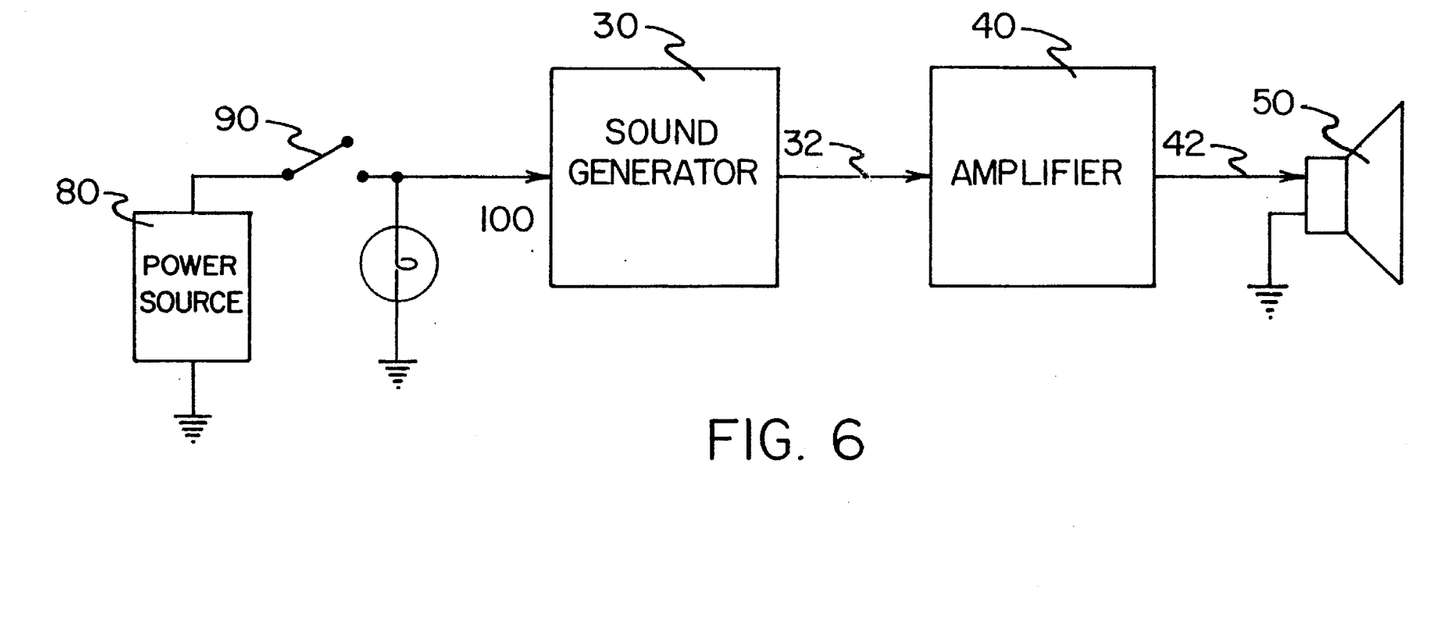
FIG. 6 is a schematic diagram of the circuitry of the present invention.

Also included is a sound generator 30. The sound generator is disposed within the container. The sound generator is used for generating a speaker activation signal 32 when electrically energized. The sound generator is conventional in design and uses standard commercially available circuit components.

An amplifier 40 is disposed within the container and coupled to the sound generator. The amplifier receives the speaker activation signal and transmits an amplified speaker activation signal. The amplifier is conventional in design and formed of commercially available circuit components. Furthermore, the amplifier can include a user-adjustable knob 42 or a volume control knob extended therefrom for allowing the intensity of the speaker activation signals to be modified.

A speaker 50 is included. The speaker generates a noise that is irritating to barracudas when the speaker receives the amplified speaker activation signal 42. The sound generator 30 allows the speaker to transmit audible sounds in the range of human hearing or ultrasonic sounds above this range. The speaker is conventional in design and commercially available.

To transfer the amplified speaker activation signals from the amplifier to the speaker, an elongated speaker cable 60 is utilized. The speaker cable is electrically-conductive and is encased in a waterproof sheath. The speaker cable has a length at least fifteen times greater than the length of the container. This allows the speaker to be extended a distance to preclude hazardous noise generated therefrom from injuring a user located near the container. The speaker cable further includes a base end 62 snugly extended through the grommet of the container and coupled to the amplifier 40. When the cable is disposed through the grommet, a watertight seal is created, thereby precluding water from entering the container. The speaker cable also has a tip end 64 coupled to the speaker.

To allow the speaker to be submerged under water, a sphere is used for encasing the speaker. The sphere is formed of a rigid waterproof plastic first hemispheric shell 70 secured about the tip end of the cable and peripherally extended about and secured to the speaker. Furthermore, a perforated rigid waterproof plastic second hemispheric shell 72 is coupled to the first hemispheric shell. In this fashion, the terminals of the speaker are precluded from becoming wet and possibly corroding.

Also provided is a battery 80. The battery is disposed within the container. The battery supplies electrical energy for operation. The battery is conventional in design and commercially available. The battery may be replaced when its electrical energy has been expended.

Figure 3:
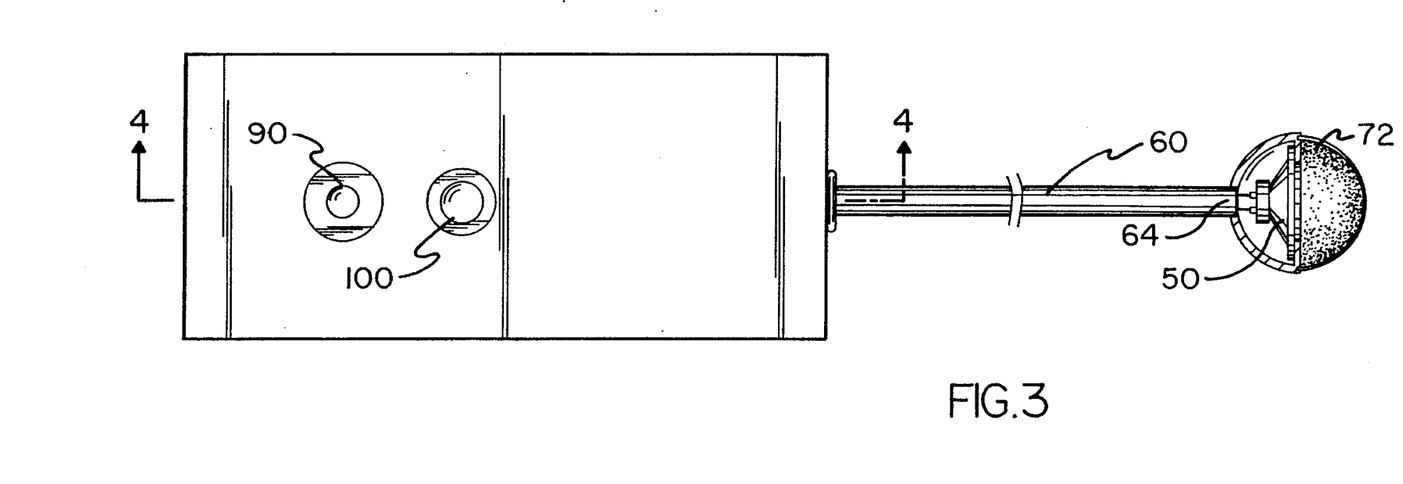
FIG. 3 is a plan view of the preferred embodiment of the present invention.

A power switch 90 is also included. The power switch is coupled between the battery and sound generator. The power switch is also extended upwards through the top wall of the container. The power switch has an enabled orientation for allowing the sound generator to be electrically energized. Furthermore, the power switch has a disabled orientation for preventing the sound generator from being electrically energized.

To provide a visual indication of operation, a lamp 100 is coupled between the power switch and sound generator and extended upwards through the top wall of the container. The lamp is positioned at a location proximal to the power switch. The lamp is illuminated when the power switch is placed in the enabled orientation. Conventional lamp circuitry such as a light-emitting diode may be utilized.

Figure 5:
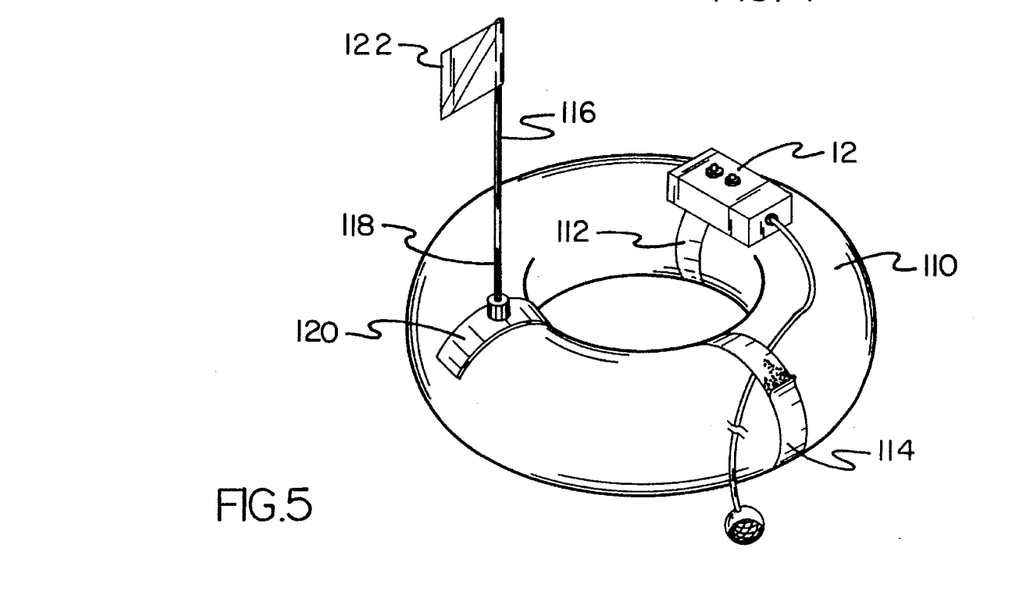
FIG. 5 is a perspective view of an alternate embodiment of the present invention.

Another embodiment of the present invention is shown in FIG. 5. This embodiment includes substantially all of the components of the present invention and further includes a toroid-shaped inflatable rubber float 110. A first securement strap 112 is coupled to the bottom wall of the container. The ends of the securement strap are removably securable in a closed loop configuration about the float using a hook and loop fastener. Also included is a second securement strap 114. The second securement strap has ends removably securable in a closed loop configuration about the float and speaker using a hook and loop fastener. The second securement strap holds the speaker at a predetermined distance beneath the surface of the water as a function of the amount of speaker cable extended downwards from the float. To provide a visual indication of the position of the float, a diver's flag 116 is included. The diver's flag includes a pole 118 with a base end secured to the float. This securement is performed with an adhesive strip 120. Also, the pole has a tip end with a pennant 122 secured thereto. The pennant has an indicative color that is readily recognizable at a distance.

Figures 7, 8:
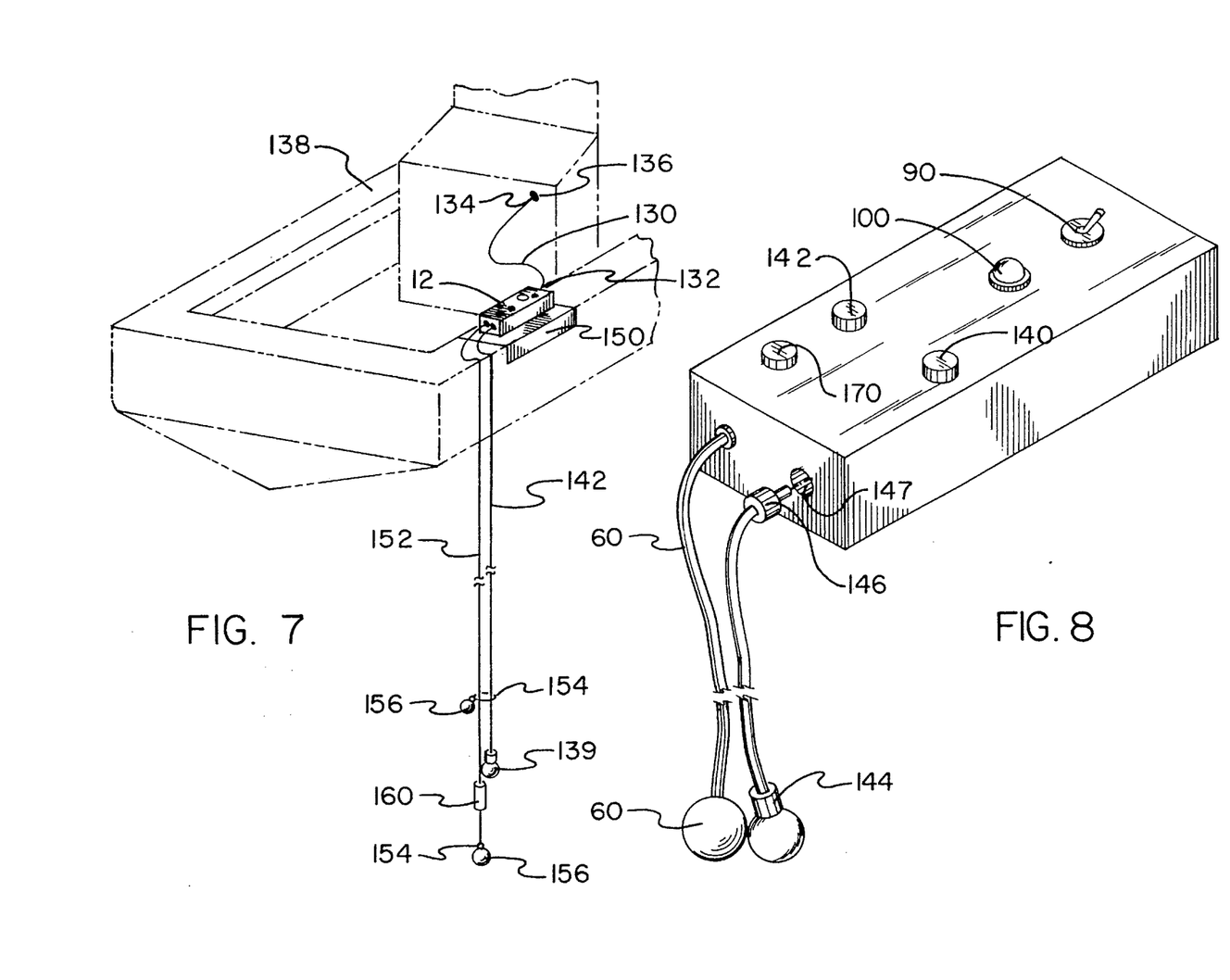
FIG. 7 is a perspective view of another alternate embodiment of the present invention.
FIG. 8 is an enlarged perspective view of the container of the alternate embodiment of FIG. 7.

Yet another embodiment of the present invention is shown in FIG. 7. This embodiment includes substantially all of the components of the preferred embodiment with some variations. Electrical power is supplied through an electrical cable 130 for operation. The cable includes a proximal terminal end 132 coupled to the power switch 90 and a distal plug end 134 that is securable within an electrically energized cigarette lighter socket 136 of a boat 138 or other motorized vehicle. Electrical power can also be provided by wires secured between the power switch 90 and a battery of a boat 138. In addition, a strobe light 139 is included for providing flashing radiant illumination for frightening barracudas from an area of interest. The strobe light is actuated by a strobe light switch 140 that coupled to the electrical cable 130. The strobe light switch is adjustable for controlling and varying the rate at which the strobe light is flashed. An extendable strobe light power cable 142 is provided and has a terminal end 144 connected to the strobe light and a removable plug end 146 removably connected to a socket 147 in electrical communication with the strobe light switch 140. The strobe light is positionable beneath the surface of the water as a function of the extension of the strobe light power cable 142 payed out from the boat 138. The container 12 is removably secured to the side of the boat 138 with a mounting mechanism 150. The mounting mechanism can be of a snap-in place type, a bolted-type, or a pile fastener type. The mounting mechanism precludes the present invention from falling of a boat in rough water.

Furthermore, in this embodiment, a plurality of electrically-conductive cable sections 152 form the speaker cable 60. The cable sections are removably coupled together in an end-to-end configuration and enable a user to adjust the length of the cable for placing the speaker 50 at a desired depth within a body of water. Cables sections of this type can also be used in conjunction with the strobe light 139. A plurality of snap-swivels 154 or other similar type openable ring mechanisms are also provided and are removably secured to the speaker cable 60 and the strobe light power cable 142. Each snap-swivel is adapted to be coupled with a weight 156 or sinker. The securement of the weights or sinkers to the speaker cable 60 or strobe light power cable thereby holds the speaker and strobe light in relatively set positions and thus prevents them from drifting in a body of water due to unforseen currents. In addition, the speaker 50 is encased in a generally tubular perforated shell 160 that allows noise to be generated in all directions.

As best illustrated in FIG. 8, this alternate embodiment also includes a knob-actuated frequency selector mechanism 170 coupled to the sound generator 30 and extended from the container 12. The frequency selector mechanism 170 allows generation of a speaker activation signal at a selected frequency, thereby allowing control of pitch of the noise generated from the speaker 50. Preferably, the frequency selector mechanism allows user selection of one frequency of a set of five individual frequencies available for use. Volume of the noise generated from the speaker is controlled through a knob-actuated volume control mechanism 42 coupled to the sound generator 30 and extended from the container.

Figure 9:
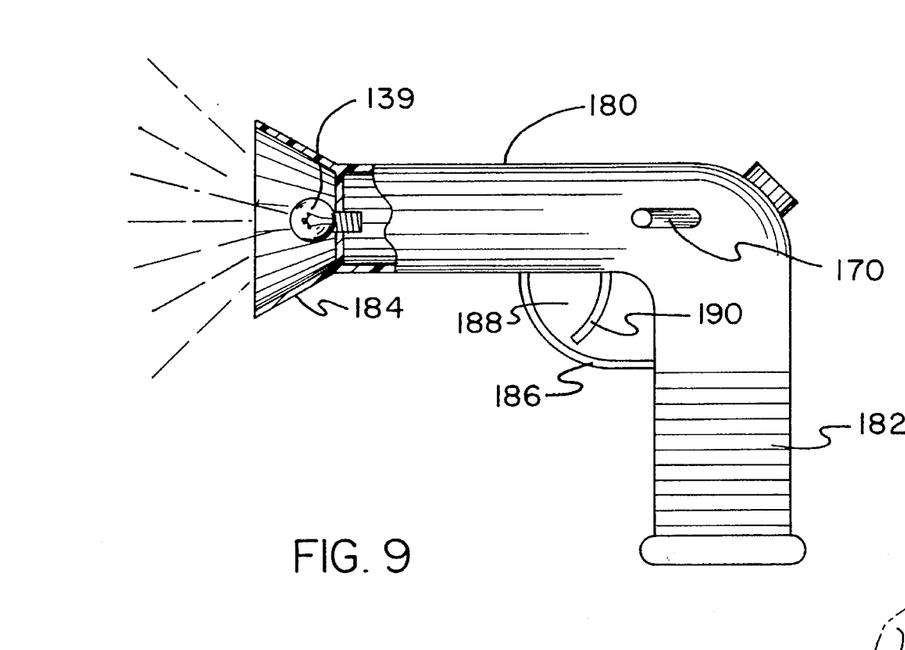
FIG. 9 is a perspective view of yet another alternate embodiment of the present invention.
Figure 10:
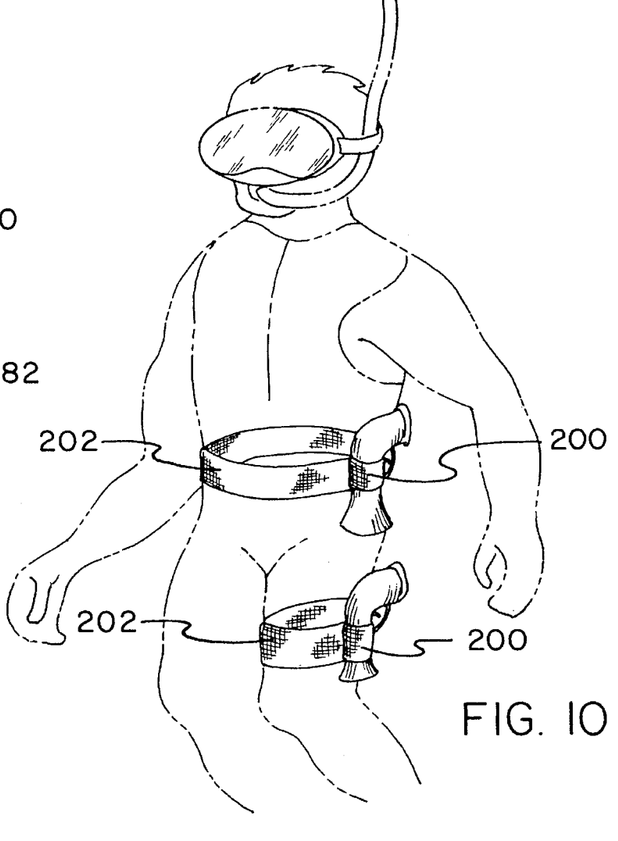
FIG. 10 is a perspective view of the alternate embodiment of FIG. 9 when placed in a holster and secured to a diver.

Still yet another embodiment of the present invention is shown in FIG. 9. In this embodiment, the circuitry shown in FIG. 6 is encased in a waterproof container generally shaped like a pistol 180. The pistol has a hand grip 182, a barrel 184 extended outwards from the hand grip, and a trigger guard 186 coupled between the barrel and handgrip to define a trigger holding space 188. The power switch 90 is formed as a trigger 190 that is extended from the barrel of the pistol and into the trigger holding space. The speaker 50 is positioned within the barrel for projecting noise that is irritating to barracudas. Also included is the strobe light 139. The strobe light is positioned within the barrel for projecting flashing light that is irritating to barracudas. A strobe light switch 140 is coupled between the strobe light and trigger and extended from the barrel 184 at a rear extent thereof for controlling a rate at which the strobe light is strobed. A user-actuatable frequency selector mechanism 170 is coupled to the sound generator and extended from the pistol and allows generation of a speaker activation signal at a selected frequency. Lastly, as shown in FIG. 10, a holster mechanism 200 is provided. The holster mechanism is securable to a diver's body and is used to holding the pistol 180 in a stowed configuration. An adjustable strap 202 is provided that allows the holster to be secured about a diver's waist or leg.

The present invention is a device which utilizes sound waves to drive away barracudas that prey on other fish. The present invention is portable in design but can also be mountable on the hull of a boat to send out waves which are at a frequency or frequencies that are extremely irritating to barracudas. The noise generated from the present invention is within the range of hearing of humans or ultrasonic in nature. The noise can be a high pitch tone, a low pitch tone, or a warble sound. To preclude damaging a user's hearing, the present invention employs an elongated cable to extend the speaker outwards and downwards to a remote location. The present invention in a floating-type form can also emit the same disturbing noises down into the water when activated by closing a switch. The storage batteries on the vessel or contained within the unit power the present invention. A completely portable system would contain storage batteries in a watertight container.

When fishing, the present invention is turned on to drive away barracudas. Divers may also prefer to utilize the alternate embodiment of the present invention which is mounted on a float and displays a flag to indicate that a diver is operating in the vicinity.

Both anglers and divers complain bitterly about large barracudas and their aggressive actions. The barracudas eat the hooked fish before a fisherman can take it in, while divers are in great fear of being bitten by them. The present invention will cause barracudas to avoid the area. The float in the alternate embodiment may also be set up to protect swimmers in an area.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A barracuda-repelling sound generation device comprising:

sound generator means for generating a speaker activation signal when electrically energized;

remote speaker means positionable beneath the surface of a body of water for generating a noise capable of repelling barracudas upon receipt of the speaker activation signal;

weight means removably securable to the remote speaker means for maintaining the remote speaker means in a set position beneath the surface of the body of water;

speaker cable means for transferring speaker activation signals from the sound generator means to the speaker means;

power supply means for supplying electrical energy for operation; and power switch means for selectively supplying electrical energy to the sound generator means;

wherein the sound generator means and power switch means are encased in a waterproof container.

2. The barracuda-repelling sound generation device as set forth in claim 1 further comprising:

a rigid waterproof first hemispheric shell extended about and secured to the speaker means; and a perforated rigid plastic second hemispheric shell coupled to the first hemispheric shell to define a sphere that generally encases the speaker means.

3. The barracuda-repelling sound generation device as set forth in claim 1 further including lamp means for providing a visual indication when the sound generation means is electrically energized.

4. A barracuda-repelling sound generation device for driving away barracudas in an area comprising, in combination:

a hollow rectangular box-shaped container formed of a rigid waterproof plastic having a top wall, a bottom wall, and a periphery interconnected therebetween and with the periphery formed of a pair of long side walls and a pair of short side walls, the container further having a hole disposed through one short side wall with a grommet snugly fit therein;

a sound generator disposed within the container for generating a speaker activation signal when electrically energized;

an amplifier disposed within the container and coupled to the sound generator for receiving the speaker activation signal and transmitting an amplified speaker activation signal;

a speaker for generating a noise capable of repelling barracudas upon receipt of the amplified speaker activation signal;

an elongated electrically-conductive sheathed waterproof speaker cable for transferring amplified speaker activation signals from the amplifier to the speaker, the speaker cable having a length at least 15 times greater than the length of the container, the speaker cable further having a base end snugly extended through the grommet of the container and coupled to the amplifier and a tip end coupled to the speaker;

a rigid waterproof plastic first hemispheric shell secured about the tip end of the cable and peripherally extended about and secured to the speaker;

a perforated rigid plastic second hemispheric shell coupled to the first hemispheric shell to define a sphere that generally encases the speaker;

a battery disposed within the container for supplying electrical energy for operation;

a power switch coupled between the battery and sound generator and extended upwards through the top wall of the container, the power switch having an enabled orientation for allowing the sound generator to be electrically energized and a disabled orientation for preventing the sound generator from being electrically energized;

a lamp coupled between the power switch and sound generator and extended Upwards through the top wall of the container at a location proximal with the power switch and with the lamp illuminated when the power switch is placed in the enabled orientation;

a toroid-shaped inflatable rubber float;

a first securement strap coupled to the bottom wall of the container and having ends removably securable in a closed loop configuration about the float;

a second securement strap having ends removably securable ii a closed loop configuration about the float and speaker cable for holding the speaker at a predetermined distance beneath the surface of the water as a function of the amount speaker cable extended downward therefrom; and a diver's flag for providing a visual indication of a position of the float, the diver's flag including a pole with a base end secured to the float with an adhesive strip and a tip end with a pennant with an indicative color secured thereto.

5. The barracuda-repelling sound generation device as set forth in claim 1:

wherein the sound generator means and power switch means are encased in a waterproof container;

and further comprising float means for allowing the container to float upon a body of water.

6. The barracuda-repelling sound generation device as set forth in claim 1:

wherein the sound generator means and power switch means are encased in a waterproof container;

and further comprising:

float means for allowing the container to float upon a body of water; and signaling means coupled to the float for providing a visual indication of a position of the float means.

7. The barracuda-repelling sound generation device as set forth in claim 1 wherein the power supply means is an electrical cable having a proximal terminal end coupled to the power switch means and a distal plug end securable within an electrically energized cigarette lighter socket of a vehicle or boat.

8. The barracuda-repelling sound generation device as set forth in claim 1 and further comprising:

a strobe light;

strobe light switch means coupled to the power supply means for controlling a rate at which the strobe light is strobed; and an extendable strobe light power cable having a terminal end coupled to the strobe light and a removable plug end coupled to the strobe light switch means and with the strobe light positionable beneath the surface of the water as a function of the extension of the strobe light power cable.

9. The barracuda-repelling sound generation device as set forth in claim 1 and further comprising container mounting means for mounting the container to a side of a boat.

10. The barracuda-repelling sound generation device as set forth in claim 1 wherein the speaker cable means is formed of a plurality of electrically conductive cable sections removably coupled together in an end-to-end configuration for adjusting the depth of the remote speaker means beneath the surface of the body of water.

11. The barracuda-repelling sound generation device as set forth in claim 1 and further comprising user-actuatable frequency selector means coupled to the sound generator means for allowing generation of a speaker activation signal at a selected frequency and thereby allowing control of pitch of the noise generated from the remote speaker means.

12. A barracuda-repelling sound generation device comprising:

sound generator means for generating a speaker activation signal when electrically energized;

remote speaker means positionable beneath the surface of a body of water for generating a noise capable of repelling barracudas upon receipt of the speaker activation signal;

speaker cable means for transferring speaker activation signals from the sound generator means so the speaker means;

power supply means for supplying electrical energy for operation;

power switch means for selectively supplying electrical energy to the sound generator means;

wherein the sound generator means, remote speaker means, speaker cable means, power supply means, and power switch means are encased in a waterproof container having a hand grip, a barrel extended outwards from the hand grip, and a trigger guard coupled between the barrel and handgrip to define a trigger holding space;

wherein the power switch means includes a trigger extended from the barrel of the container into the trigger holding space;

wherein the remote speaker means is a speaker positioned within the barrel for projecting noise therefrom;

and further comprising:

a strobe light positioned within the barrel for projecting light therefrom;

strobe light switch means coupled to the power supply means and extended from the barrel at a rear extent thereof for controlling a rate at which the strobe light is strobed;

user-actuatable frequency selector means coupled to the sound generator means for allowing generation of a speaker activation signal at a selected frequency and thereby allowing control of pitch of the noise generated from the remote speaker means; and holster means securable to a diver's body for holding the container in a stowed configuration.

* * * * *